Oct. 17, 1967
M. WILEY
3,347,025
AIR CIRCULATION SYSTEM
Filed Aug. 12, 1965
2 Sheets-Sheet 1
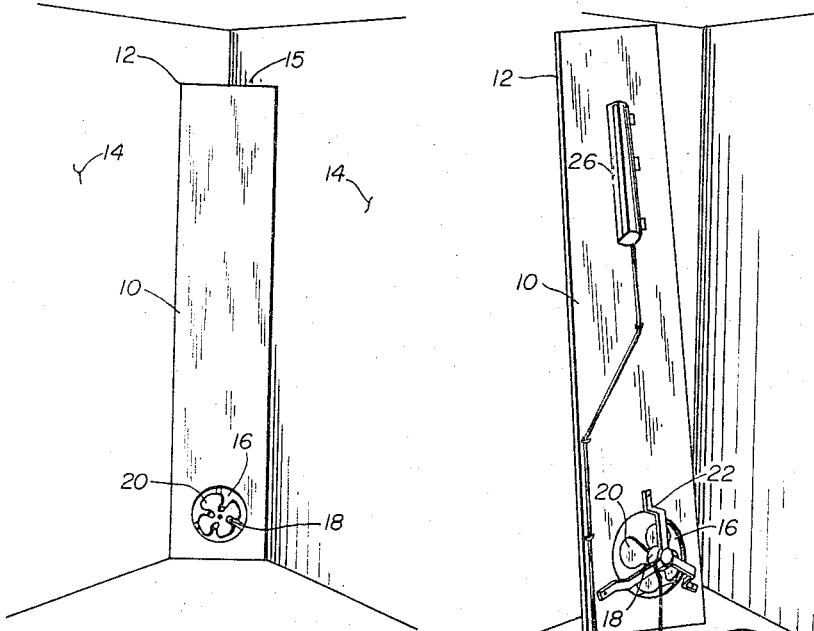
Fig. 1.
Fig. 2.
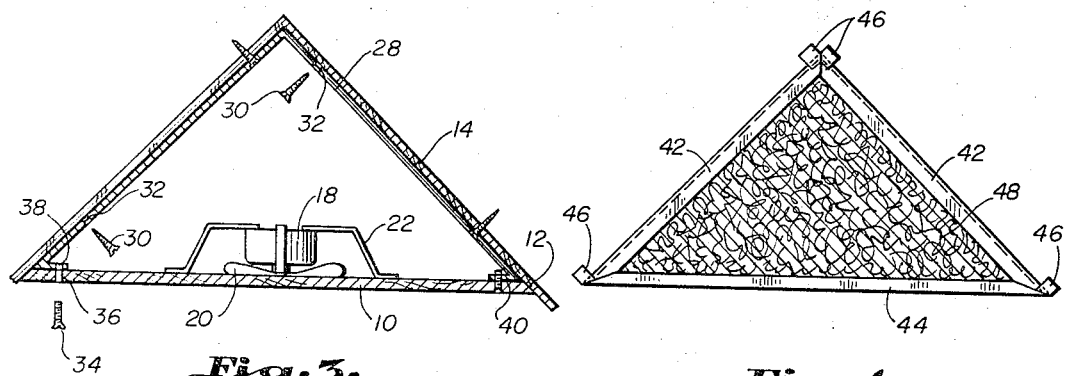
Fig. 3.
Fig. 4.
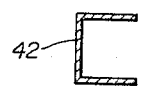
Fig. 4A.
INVENTOR.
MANNIE WILEY
BY Head & Johnson
ATTORNEYS

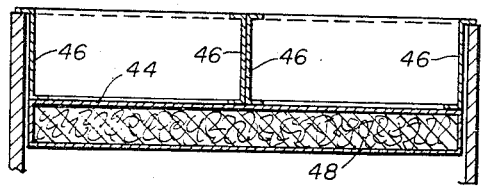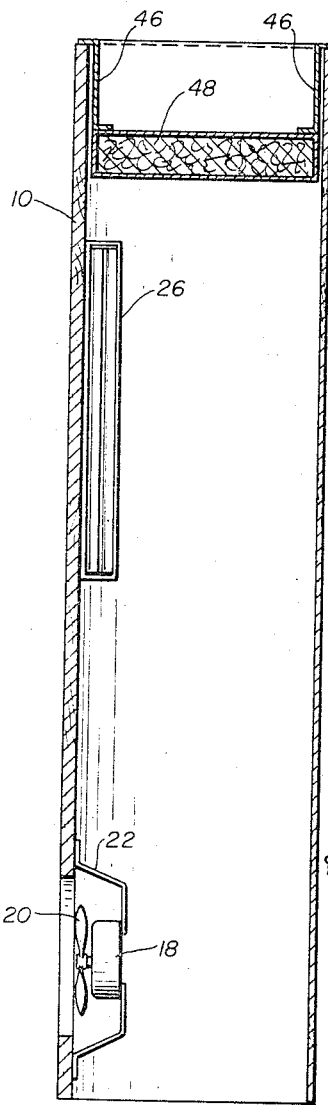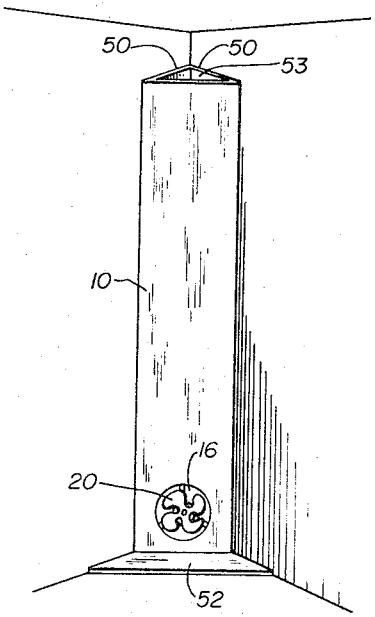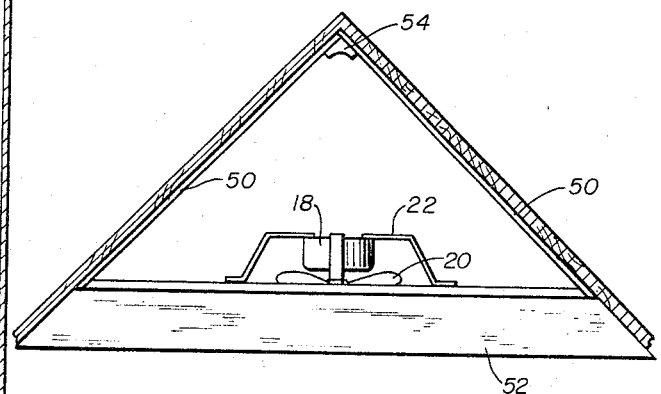

3,347,025
AIR CIRCULATION SYSTEM
Mannie Wiley, 1243 Mabelle Drive,
Sapulpa, Okla. 74066
Filed Aug. 12, 1965, Ser. No. 479,239
2 Claims. (Cl. 55—279)

This invention relates to an improved air circulation system. More particularly, this invention relates to an air circulation system which includes air filtration and air purification means. Still more particularly this invention relates to a circulation system which may be made portable and which includes air filtration and air purification means.

With adequate circulation the air in an enclosed area, for example a room of a dwelling place, becomes stratified; the colder air tends to occupy a layer near the floor and the warmer air tends to occupy a layer near the top of the enclosure. The stratification of the air occurs whether the enclosed area is being heated in cold weather or whether it is being cooled in hot weather. Also, stratification is more pronounced whenever the circulatory movement of the air slows down. When a house is heated with convection-type equipment, e.g., a floor furnace or a unitary space heater, the movement of the air is slower than when the house is heated with a forced-air type of heating. The usual convection heater relies on the heating of the air in the immediate vicinity of the heater to effect the circulation of the air by reason of the rising of the warmed air. However, even when the heating system is of the common forced-air type the air circulation can become inefficient in a space somewhat remote from the centralized blower. Similarly, where the house is cooled by means of forced-air air-conditioning units, it is possible that spaces which are removed from the air-conditioning unit may experience stratification. The stratification may occur where the air-conditioning is by means of the common window unit or where the cooling system is incorporated into the central heating system.

Not only is air stratification a common problem but the purity of the air being circulated is a related problem. In the convection type of heating no purification means can be incorporated in the heating system. Even in the usual forced air type of heating or cooling, in which a filter means of some sort is usually incorporated, the filter means is generally located in close proximity to the central unit and quite remote from certain of the areas to be heated or cooled. This means that the returned air has a considerable distance to travel and is not subject to the same forced flow as the air leaving the central unit. Thus, because of the inherent reduced air flow of the returned air, only a small portion of the dust and other impurities can be carried back to the central unit and removed from the air by the filter. The velocity of the returned flow of air is such that these particles settle out in the area being heated or cooled before they can be removed by the filter.

A problem closely related to the filtration of air is the purification of the air with or without filtration. The purification of the air, that is, the removal of odors, germs, and bacteria, is not necessarily brought about by the employment of a filter which is intended to remove large sized dust particles. The particles or organisms affecting health are sufficiently small to pass through the common dust filter. Besides these microscopic organisms which pass through the filter, a certain proportion of these infectious organisms will cling to the dust particles themselves, and when the dust particles settle out before reaching the filter, these organisms will thus remain in the inhabited area of the dwelling to incubate and further spread their disease potential.

The primary object of this invention is to provide means for the efficient circulation of air within an enclosed area.

A further object of this invention is to provide a device capable of improving air circulation within a dwelling place so that substantial savings will result from the heating and cooling thereof.

Another object of this invention is to provide a device to improve air circulation, to filter the air being circulated, and to purify the air being circulated.

Further objects and advantages of the invention will become apparent from the following description and claims, and from the accompanying drawings, wherein:

FIGURE 1 is a perspective view of the invention mounted in a corner of a room.

FIGURE 2 is a rear view of the front panel of the invention showing components in place.

FIGURE 3 is a top elevational view of the invention mounted in place with the filter unit removed.

FIGURE 4 is a top elevational view of a filter unit of the invention.

FIGURE 4a is a cross-sectional view of a channel member of the filter unit of the invention.

FIGURE 5 is a front elevational view of a filter unit of the invention.

FIGURE 6 is a perspective view of a portable modification of the invention situated in a corner of a room.

FIGURE 7 is a vertical cross-sectional view of a unit of the invention.

FIGURE 8 is a top elevational view of a portable modification of the invention with filter unit removed.

This invention provides an air circulation unit which is suitable for either permanent installation in a dwelling place or other enclosed area, or for portable usage in such an area, whereby the air circulation system includes a blower to provide the efficient circulation of the air, a filter system to remove discrete particles from the air, and an ultra-violet lamp unit to purify the air being circulated.

Referring now to the drawings in detail, a permanent installation of the invention is described in FIGURE 1 wherein the front panel 10 is positioned diagonally in a corner of a room with the beveled edges 12 of the front panel 10 in sealing engagement with the adjoining walls 14 of the room. When the invention is made into a permanent installation, the front panel 10 cooperates with the walls 14 to provide an opening 15 in the upper end of the unit near the ceiling to provide the air passage route through the unit. In the description of the invention shown in FIGURE 1 the front panel 10 is pictured as having been installed after the construction of the walls 14, but, if desired, the front panel 10 could be incorporated into the wall structure during construction with the component parts of the invention installed as hereinafter described. Near the lower portion of the front panel 10 is the air passage 16 behind which is located the motor 18 driving the fan 20. FIGURE 2 is a view of the rear of front panel 10 and shows the manner in which the motor 18 is mounted and held in place by the brackets 22. The motor 18 provides an air exhaust means for the duct described when the invention is installed, and preferably is a three-speed reversible motor. Secured to the back of the front panel 10 intermediate between the air passage 16 and top opening 15 is the ultra-violet lamp 26, a conventional type lamp of a size suitable for the installation. The ultra-violet lamp 26 is preferably connected in the same circuit as the motor 18. The lamp 26 may be positioned either vertically as shown or horizontally. For a permanent installation of the invention FIGURE 3 discloses one method of installing the front panel 10. A series of adapter brackets 28 are secured in place against the walls 14 by means of the wood screws 30 placed to appropriate screw holes 32. The adapter bracket 28 shown is a thin narrow strip of either steel or aluminum. Then after the installation of the brackets 28 the front panel 10 is held in place by means of the penetration of the machine screws 34 through the screw holes 36 of the front panel 10 and into the screw holes 38 in the located flange portion 40 of bracket 28. FIGURE 4 describes a filter unit which fits into the top opening 15 of the air circulation stack. The filter unit is seen to consist of a frame portion and insertable filter component. The filter frame consists of the two channel members 42 meeting along the back side at a right angle and positioned with the open face of each channel member facing forward. Forming the front edge of the filter frame are two narrow strips 44 secured to the outer end of each of the channel members and providing an open space between the strips 44. Spaced at the three corners of the filter frame are a series of lip rests 46. The lip rests 46 are designed to support the filter unit in the top opening 15 at a sufficient number of points to give adequate support to the unit. The conformation of the channel members 42 is described by the cross-sectional view of FIGURE 4-A. In FIGURE 5 the manner in which the lip rest 46 supports the filter unit is shown. The lip rest extends over the edge of the brackets 28 and permits the filter unit to rest below the top of the opening 15. The filter frame may be built from either iron or aluminum, although aluminum is preferred for its easy workability, resistance to corrosion, and overall low cost. In FIGURES 4 and 5 a filter element 48 is shown in position in the filter frame. The preferable material is a conventional spun glass filter element, but other common materials such as aspen wood or Fiberglas may also be used.

A slightly modified version of the invention is shown in FIGURE 6, wherein the front panel 10 is sealably secured to two back panels 50 and to a base 52, to form a portable air circulation system. Front panel 10 cooperates with back panels 50 to provide top opening 53, which corresponds to opening 15 of the permanent type installation of FIGURE 1. In the construction of the portable unit, plywood is the preferred material for the panels and for the base, although the unit could be constructed of some of the common plastic materials. The arrangement of the components of the portable modification is the same as in the permanent installation type of air circulation system, and FIGURE 7 describes a cross-sectional view of a unit of the invention showing the spatial arrangement of the parts. The lip rests 46 support the filter unit by resting upon the adapter brackets 28 on the permanent installation modification, and by resting upon the upper edge of the back panels 50 of the portable unit. In either type of installation the lip rests may simply lie upon the respective top portion of the unit or may be held in easily removable fashion thereto by any type of temporary fastener. FIGURE 8 describes the manner in which the panels are assembled when plywood is the construction material, showing the preferred means of overlapping the ends of the panels, and describing how the corner brace 54 provides added strength for the back panels. Of course, a permanent type installation could be provided by assembling front panel 10 and back panels 50 without the use of base 52, should this type installation be desired, as where, for some reason, the walls of the room could not be utilized.

In operation, the air circulation system of this invention may be employed either where the enclosed area is being heated or being cooled. Where the area, for instance, a room of a house, is being heated, the unit draws warm air into the top of the duct, through the filter 48, around the area of the ultra-violet lamp 26, and out the air passage 16 by means of the motor driven fan 20. Thus, the air of the room is prevented from becoming stratified as hereinbefore described, and is not only circulated but is cleaned of dust and other foreign particles by operation of the filter, and is purified by operation of the ultra-violet lamp. Without being restricted to a particular theory of operation of the ultra-violet lamp, it is generally assumed that an ultra-violet lamp kills germs and purifies air through the chemical action of the ozone generated by the near ultra-violet portion of the spectrum produced by the lamp. Ozone is a well known germicide and is also effective in destroying odors. Thus, the warm air passing through the lower air passage 16 is now dust free, essentially germ free, and odor free. With a three-speed reversible motor driving the fan 20, the volume of air being circulated can be adjusted to suit the circumstances. Also, by employing a reversible motor, the unit may be used to circulate cooled air to assist the air circulation when air conditioning is employed. In circulating the cooled air, of course, the air is drawn inwardly through the air passage 16 by the fan 20 and passes upward past the ultra-violet lamp 26 and through the filter element 48 and out the top opening 24 of the air circulation unit. For some architectural effects the front panel 10 may be blended into the walls, such as being curved, either concave or convex.

The fan motor and ultra-violet lamp may operate on either the same circuit or on separate circuits. Further, either or both the fan motor and ultra-violet lamp may have conventional timing devices incorporated in their circuits to provide additional selectivity of operating conditions.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:
1. A portable air circulation stack comprising:
   an enclosed vertical duct comprised of a first and a second vertical panel member adjoining each other along a first edge of each substantially at a right angle, and a vertical front panel adjoining the other edge of each of said first and second panels to form said duct in a triangular configuration, said duct having a closed lower end and an open upper end, and said front panel having an opening in the lower portion thereof,
   a removable air filter unit supported across said duct in said open upper end comprising,
   a triangular frame portion positioned within said duct, said frame having a first and a second channel member joined at a first end of each to form the back legs of said triangular frame, and two parallel spaced strips disposed between the second ends of each of said channel members to form the front leg of said triangular frame,
   a plurality of hanger members securely spacedly on said triangular frame, each of said hanger members having a lip portion in removable contact with the top edge of said vertical panel members,
   a filter blanket of interwoven spun glass fibers slidably positioned in said triangular frame,
   ultra-violet lamp means positioned within said duct intermediate said open upper end and said opening in said front panel, and
   a reversible three-speed motor with fan positioned adjacent said opening in said front panel to circulate air through said stack.
2. An air circulation stack comprising:
   an enclosed vertical triangular duct comprised of two adjoining walls of a room and a vertical front panel, said front panel having each of its vertical edges in sealed contact with an adjacent one of said walls, said duct having a closed lower end, an open upper end, and including an adaptor bracket within said duct adjacent said upper end and securing said front panel to said walls, and said front panel having an opening in the lower portion thereof,
   a removable air filter unit supported across said duct in said open upper end comprising:

a triangular frame portion positioned within said duct, said frame having a first and a second channel member joined at a first end of each to form the back legs of said triangular frame, and two parallel spaced strips disposed between the second end of each of said channel members to form the front leg of said triangular frame, a plurality of hanger members secured spacedly on said triangular frame, each of said hanger members having a lip portion in removable contact with the top edge of said adaptor bracket, and a filter blanket of interwoven spun glass fibers slidably positioned in said triangular frame, ultra-violet lamp means positioned within said duct intermediate said open upper end and said opening in said front panel, and a reversible three-speed motor with fan positioned adjacent said opening in said front panel to circulate air through said stack.

References Cited

UNITED STATES PATENTS

| | | | |
|---|---|---|---|
| 1,080,399 | 12/1913 | Young | 55—521 X |
| 2,010,809 | 8/1935 | Braine. | |
| 2,239,508 | 4/1941 | Sipp et al. | 98—40 X |
| 2,347,954 | 5/1944 | Kiely. | |
| 2,528,650 | 11/1950 | Graham. | |
| 2,912,159 | 11/1959 | Ganger et al. | 230—259 |
| 3,105,733 | 10/1963 | Potapenko | 21—74 |

OTHER REFERENCES

Marsh, R. C.: "Laminar Air Flow For Contamination Control," Journal of American Association ofr Contamination Control, vol. 2, No. 5, p. 10, FIGURE 3, May 1963.

HARRY B. THORNTON, *Primary Examiner.*

B. NOZICK, *Assistant Examiner.*